(12) United States Patent
Gong (10) Patent No.: US 11,992,989 B1
(45) Date of Patent: May 28, 2024

(54) DOOR WITH PLASTIC-WOOD CO-EXTRUDED SKELETON AND PROCESSING METHOD THEREOF

(71) Applicant: Union Building Products Co., Ltd, Jiujiang (CN)

(72) Inventor: Xiaoli Gong, Jiujiang (CN)

(*) Notice: Subject to any disclaimer, the term of this patent is extended or adjusted under 35 U.S.C. 154(b) by 0 days.

(21) Appl. No.: 18/488,937

(22) Filed: Oct. 17, 2023

(30) Foreign Application Priority Data

Aug. 11, 2023 (CN) .......................... 202311013323.X (51) Int. Cl.
| | |
|---|---|
| *B29C 48/20* | (2019.01) |
| *B29C 48/00* | (2019.01) |
| *B29C 48/07* | (2019.01) |
| *B29C 48/25* | (2019.01) |
| *B29C 48/285* | (2019.01) |
| *B29C 48/92* | (2019.01) |
| *B32B 5/18* | (2006.01) |
| *B32B 21/04* | (2006.01) |
| *B32B 21/08* | (2006.01) |
| *E06B 3/70* | (2006.01) |
| *E06B 3/82* | (2006.01) |
| *B29K 27/06* | (2006.01) |

(Continued)

(52) U.S. Cl.
CPC ........ *B29C 48/0021* (2019.02); *B29C 48/022* (2019.02); *B29C 48/07* (2019.02); *B29C 48/20* (2019.02); *B29C 48/252* (2019.02); *B29C 48/298* (2019.02); *B29C 48/92* (2019.02); *B32B 5/18* (2013.01); *B32B 21/047* (2013.01); *B32B 21/08* (2013.01); *E06B 3/7015* (2013.01); *E06B 3/822* (2013.01); *B29C 2948/92104* (2019.02); *B29C 2948/92209* (2019.02); *B29K 2027/06* (2013.01); *B29K 2075/00* (2013.01); *B29K 2105/043* (2013.01); *B29K 2311/14* (2013.01); *B32B 2250/40* (2013.01); *B32B 2266/0278* (2013.01); *B32B 2419/00* (2013.01); *E06B 2003/7023* (2013.01)

(58) Field of Classification Search
CPC .................................................... B29C 48/20
See application file for complete search history.

(56) References Cited

U.S. PATENT DOCUMENTS

| | | | | |
|---|---|---|---|---|
| 2,926,729 | A * | 3/1960 | Zanini ....................... | E06B 9/15 264/261 |
| 3,084,662 | A * | 4/1963 | Badger ................... | B05C 3/125 118/DIG. 9 |

(Continued)

FOREIGN PATENT DOCUMENTS

| | | | | |
|---|---|---|---|---|
| CN | 104210080 | A * | 12/2014 | ........... B29C 47/025 |
| CN | 105464539 | A * | 4/2016 | |

(Continued)

*Primary Examiner* — Timothy Kennedy (57) ABSTRACT

The present disclosure relates to the technical field of door processing, and in particular to a door with a plastic-wood co-extruded skeleton and a processing method thereof. The door includes a door skeleton, including four multilayer boards; where the four multilayer boards form a rectangular frame structure; an outer surface of each multilayer board is wrapped with a PVC wrapping layer, and an outer side of the PVC wrapping layer is attached to an SMC door skin; a PU filling foam is filled between an outer periphery of the door skeleton and a wall structure outside the door skeleton.

8 Claims, 5 Drawing Sheets

(51) Int. Cl.
*B29K 75/00* (2006.01)
*B29K 105/04* (2006.01)
*B29K 311/14* (2006.01)

(56) References Cited

U.S. PATENT DOCUMENTS

| | | | | |
|---|---|---|---|---|
| 4,263,348 A | * | 4/1981 | Renegar | B44D 3/22 |
| | | | | 118/411 |
| 4,333,417 A | * | 6/1982 | Camp | B05C 3/10 |
| | | | | 118/406 |
| 4,581,807 A | * | 4/1986 | Adell | B60R 13/043 |
| | | | | 264/173.17 |
| 4,589,456 A | * | 5/1986 | Traben | B27B 1/00 |
| | | | | 144/120 |
| 5,052,452 A | * | 10/1991 | Goenner | B27L 5/06 |
| | | | | 83/365 |
| 5,326,592 A | * | 7/1994 | Goewey | B29C 48/155 |
| | | | | 427/256 |
| 5,538,777 A | * | 7/1996 | Pauley | B29C 48/11 |
| | | | | 49/490.1 |
| 8,113,143 B2 | * | 2/2012 | Prince | B29C 48/154 |
| | | | | 118/406 |
| 8,734,909 B2 | * | 5/2014 | Iyer | B29C 48/155 |
| | | | | 427/434.2 |
| 9,744,707 B2 | * | 8/2017 | Peavey | B32B 27/308 |
| 9,919,503 B2 | * | 3/2018 | Helton | B05D 7/06 |
| 2004/0142157 A1 | * | 7/2004 | Melkonian | B32B 5/18 |
| | | | | 428/292.1 |
| 2008/0314312 A1 | * | 12/2008 | Prince | B05C 3/00 |
| | | | | 118/75 |
| 2010/0021677 A1 | * | 1/2010 | West | B29C 48/154 |
| | | | | 427/256 |
| 2011/0223342 A1 | * | 9/2011 | Iyer | B29C 48/155 |
| | | | | 427/434.4 |
| 2015/0110988 A1 | * | 4/2015 | Peavey | B29C 48/154 |
| | | | | 29/897 |
| 2015/0110995 A1 | * | 4/2015 | Peavey | B29C 48/154 |
| | | | | 428/164 |
| 2017/0312970 A1 | * | 11/2017 | Peavey | B32B 19/00 |
| 2019/0111605 A1 | * | 4/2019 | Peavey | B29C 48/154 |

FOREIGN PATENT DOCUMENTS

| | | | | |
|---|---|---|---|---|
| CN | 112277278 A | * | 1/2021 | |
| FR | 3093461 A1 | * | 9/2020 | ........... B26D 1/0006 |

* cited by examiner

DOOR WITH PLASTIC-WOOD CO-EXTRUDED SKELETON AND PROCESSING METHOD THEREOF

CROSS REFERENCE

The present disclosure claims priority of Chinese Patent Applications No. 202311013323.X, filed on, Aug. 11, 2023, the entire contents of which are hereby incorporated by reference in their entirety.

TECHNICAL FIELD

The present disclosure relates to technical field of door processing, and in particular to a door with a plastic-wood co-extruded skeleton and a processing method thereof.

BACKGROUND

A wood-plastic composite panel is a high-tech environmentally friendly new decorative material made of wood as the base material, thermoplastic polymer materials, and processing aids, mixed homogeneously and then heated and extruded by a mold equipment. The wood-plastic composite panel has properties and features of both wood and plastic and is therefore a new composite material that can replace wood and plastic.

Chinese Patent Application No. 2020111218034 discloses a wood-plastic door PVC co-extrusion covering device, including a material extrusion box; where an edge of the material extrusion box is arranged with a feeding bin, and an end surface on a long edge side of the material extrusion box is arranged with a discharge port; two sides of an exit of the discharge port is fixedly arranged with an induction baffle; a top of the induction baffle is fixedly arranged with a drying bracket. A surface of the drying bracket is uniformly arranged with a drying fan, and there is an outer bracket placed above a middle part of the induction baffle. The device has poor covering performance for wood-plastic doors, and the covering efficiency is low.

For an existing plastic-wood co-extruded skeleton, a molten state PVC material is usually subjected with a wrapping process, laminated to the wood, and the wrapped wood is applied for skeleton building. However, because the wood itself will produce small-size debris and burrs in the cutting and extruding process, and the debris and burrs will be mixed in the PVC material wrapping process, resulting in bulging and unattractive.

In addition, the volume of the molten state PVC material will be decreased after condensation due to thermal expansion and contraction principle, and the existing technology cannot adaptively regulate the discharge amount of the molten state PVC material according to the value of the temperature change. The above results in dimensional changes in the PVC wrapping layer formed after condensation, and ultimately reduces the processing quality of the door with the plastic-wood co-extruded skeleton.

When there are burrs on the outer surface of the multilayer board or there is too large a deviation in size, scraping the moving multilayer board only by a fixed cutter has poor scraping effect and low scraping efficiency is low, and will also have an effect on the moving speed of the multilayer board, which will in turn have an effect on the processing efficiency of the door with the plastic-wood co-extruded skeleton.

When the existing device is in a long time of use, the internal filter screen will be blocked by burr impurities, etc., which reduces the filter effect of the filter screen on the subsequent burr impurities and will have an impact on the air pressure inside the air tank, thereby reducing the efficiency of the recovery of burr impurities.

Therefore, it is necessary to propose a door with a plastic-wood co-extruded skeleton and a processing method thereof to solve the above problem.

SUMMARY OF THE DISCLOSURE

It is an object of the present disclosure to provide a door with a plastic-wood co-extruded skeleton and a processing method thereof to solve the above problems.

The present disclosure provides a door with a plastic-wood co-extruded skeleton, including: a door skeleton, including four multilayer boards; wherein the four multilayer boards form a rectangular frame structure; an outer surface of each multilayer board is wrapped with a PVC wrapping layer, and an outer side of the PVC wrapping layer is attached to an SMC door skin; a PU filling foam is filled between an outer periphery of the door skeleton and a wall structure outside the door skeleton.

The present disclosure further provides a processing method of a door with a plastic-wood co-extruded skeleton, for processing the door with a plastic-wood co-extruded skeleton according to claim 1, including: S1: preparing a strip of wood and a mixture of glues, and processing a plurality of the strips of wood and the mixture of glues through an extruder, such that the plurality of strips of wood are extruded to form each multilayer board; S2: wrapping the outer surface of each multilayer board with the PVC wrapping layer through a hemming device; and S3: splicing the four multilayer boards wrapped with the PVC wrapping layers to form the door skeleton that is rectangular in shape, and attaching the SMC door skin to an outer side of the door skeleton.

A hemming device for a door with a plastic-wood co-extruded skeleton, configured to perform a hemming process on doors or windows through the method as above, including: an extrusion mold and a propulsion mechanism; wherein the propulsion mechanism is arranged on a side of the extrusion mold, and another side of the extrusion mold is arranged with a converging extrusion portion; the extrusion mold is arranged with a timber port for receiving the multilayer board, and a speed sensor is arranged in the timber port; a molding port is arranged in the converging extrusion portion, and a first temperature sensor is arranged in the molding port;

a molding mechanism is arranged in the converging extrusion portion; the molding mechanism includes a suction box, a burr removing frame, and a drop box; an inner circle of the suction box defines a circle of a gas groove; a top end and a bottom end of the gas groove are each through the suction box and arranged with a suction hole; each of four corners inside the burr removing frame is arranged with a corner block; a sliding plate is arranged between two the corner blocks that are parallel; each of end surfaces of four the sliding plates facing each other is arranged with a cutter; an inner circle of the drop box defines a circle of a discharge groove;

an inner wall of the discharge groove is arranged with a second temperature sensor; an inner side wall of the discharge groove near the cutter is arranged with a fixed electromagnetic plate; a magnetic slider is slidably connected to another inner side wall of the discharge groove, and the fixed electromagnetic plate and the magnetic slider are matched; a bottom on a side of the magnetic slider near the cutter is arranged with a plurality of connecting rods, and an end of each connecting rod passes through the drop box and is fixedly connected to a side wall of the sliding plate.

The device can adjust the opening size of the discharge groove according to the temperature difference detected by the first temperature sensor and the second temperature sensor; further, the device can also control the magnetic slider to move toward the fixed electromagnetic plate when the moving speed of the multilayer board decreases due to the burr on the surface of the multilayer board or the size deviation, to reduce the opening size of the discharge groove and drive the sliding plate and the cutter to move transversely, thereby improving the scraping effect on the burr on the outer surface of the multilayer board or the size deviation. The device can also change the value of the air pressure inside the gas groove, so as to realize the vibration of the filter screen, realizing the performance of clearing blockage of the filter screen.

In some embodiments, the propulsion mechanism is arranged on a side of the extrusion mold; the timber port runs through two sides of the extrusion mold; the molding port runs through two sides of the converging extrusion portion; an end of the molding port is in communication with the timber port; a radius of the molding port is greater than a radius of the timber port; the extrusion mold defines an internal cavity; a corner of the extrusion mold is beveled, and a lateral fixing block is arranged at a beveled cut; a pipe port is arranged on the lateral fixing block, and an input cylinder is flange-connected at an end of the pipe port; an injection port is arranged on the input cylinder; a metal pipe is arranged inside the pipe port, the metal pipe is connected to the injection port, and the metal pipe is extended into the internal cavity of the extrusion mold; an end of the metal pipe is shunted with a top input pipe and a bottom input pipe; a side of the top input pipe near the converging extrusion portion is connected with a first transverse pipe, and a side of the bottom input pipe near the converging extrusion portion is connected with a second transverse pipe; the PVC wrapping layer is wrapped on the outer surface of the multilayer board through the molding mechanism.

In some embodiments, the suction box, the burr removing frame, and the drop box are connected and distributed sequentially along a direction from the propulsion mechanism to the converging extrusion portion; each of the suction box, the burr removing frame, and the drop box defines a square hole for the multilayer board to pass through; the suction hole is arranged with a connecting pipe; an end of the connecting pipe is connected to a stock box; a side of the stock box near the propulsion mechanism is arranged with an air pump, and a suction port of the air pump is connected to an interior of the stock box; a filter screen is arranged in the stock box.

In some embodiments, four the cutters are affixed to four surfaces of the multilayer board; each of a top and a bottom of the drop box is connected to a triangular pipe; each of ends of two the triangular pipes away from each other defines a connection hole; one of two the connection holes is connected to the first transverse pipe, and the other of the two connection holes is connected to the second transverse pipe; the two triangular pipes are connected to the discharge groove; a side of the drop box away from the burr removing frame is arranged with a tapered end.

In some embodiments, a radius of the tapered end away from the drop box is less than a radius of the tapered end near the drop box; each of sides of the first transverse pipe and the second transverse pipe near each other is arranged with a pipe holder, and an arcuate groove is defined on each of two the pipe holders; one of two the arcuate grooves is clamped on a pipe body of the first transverse pipe, and the other of the two arcuate grooves is clamped on a pipe body of the second transverse pipe; an end of each of the two air pumps is affixed to a corresponding pipe holder; a heating wire is arranged in the arcuate groove of each of the two pipe holders, and the heating wire is affixed to the pipe body of a corresponding one of the first transverse pipe and the second transverse pipe; a side of each of the two pipe holders is connected to a wire, and the wire and the corresponding heating wire is electrically connected to each other.

In some embodiments, the propulsion mechanism includes a hydraulic cylinder and a guiding plate; the hydraulic cylinder is arranged at a bottom end of the multilayer board; a side of the hydraulic cylinder is fixedly connected to a side of the extrusion mold; the guiding plate is arranged at a top end of the multilayer board, and a side of the guiding plate is fixedly connected to the side of the extrusion mold; a top end of the guiding plate defines a sliding groove; a side of the hydraulic cylinder away from the extrusion mold is arranged with a telescopic end, and a side of the telescopic end is arranged with a push-in block.

In some embodiments, a top of the push-in block defines a slot; the top of the push-in block is arranged with a push plate, and a bottom end of the push plate is arranged with an electromagnetic block; the electromagnetic block is clamped to an interior of the slot, and the electromagnetic block and the push-in block are magnetically connected; a middle part of a top end of the push plate is arranged with a guiding block; the guiding block is slidably arranged in the sliding groove, and positions of the guiding block and the sliding groove correspond to each other; a square slot is defined on a side of the push plate near the extrusion mold, and an end of the multilayer board is clamped in the square slot.

In some embodiments, a side of the magnetic slider away from the fixed electromagnetic plate is arranged with a connection spring, and an end of the connection spring is fixedly connected to a side wall of the discharge groove; a side of the discharge groove near the magnetic slider defines a sliding slot, and a sliding stopper is slidably connected inside the sliding slot; an end part of the sliding stopper is connected to a side wall of the magnetic slider.

Technical effects and advantages of the present disclosure.

1. setting the push plate and extrusion mold: the guiding block on the push plate will enter into the sliding groove and slide in the direction toward the extrusion mold, playing a guiding role to keep the multilayer board in a vertical state in the process of pushing in. The burr or deviated part will be removed by the four cutters and will be blocked outside the burr removing frame, to be stored inside the gas groove of the suction box, thereby preventing the burr and the debris from entering into the process of pouring PVC material.

2. setting the air pump and the filter screen: the two air pumps are activated, and the filter screen is arranged between the stock box and the air pump, to prevent the debris and burrs from being sucked into the interior of the air pump and prevent bulge and unattractive appearance caused by the burrs and debris mixing with the PVC material. In addition, due to the blocking effect of the four cutters, the molten PVC material may be prevented from leaking out, and only exists in the interior of the drop box and fills up the interior of the drop box; the drop box is connected to the tapered end, such that the PVC material can be molded, thereby completing the hemming process in the process of advancing the multilayer board.

3. setting the first transverse pipe and the second transverse pipe; in addition, in the actual operation of the present disclosure, the wires on both the pipe holders are each connected to a power supply, such that the heating wires are energized to generate heat, and the heat is transferred to the first transverse pipe and the second transverse pipe; the first transverse pipe and the second transverse pipe transfer the heat to the molten PVC material input inside, thereby preventing the PVC material from cooling and solidifying, and maintaining the molten state of the PVC material. Furthermore, the air pumps are activated, and heat generated by the operation is also transferred to the first transverse pipe and the second transverse pipe through the pipe holders to maintain the heat. In addition, the two pipe holders can also support and protect the first transverse pipe and the second transverse pipe.

4. setting the fixed electromagnetic plate and magnetic slider: the device is simple to operate, with precise control and one-time realization of the outer surface of the multilayer board wrapped with the PVC wrapping layer, thereby improving the production efficiency and production effect of the door with a plastic-wood co-extruded skeleton. In addition, according to the principle of thermal expansion and contraction of the PVC material in the molten state, the magnetic force of the fixed electromagnetic plate may be correspondingly adjusted, so as to change the opening size of the discharge groove, ensuring that the PVC wrapping layer formed by condensation meets the actual size requirements, with high precision of processing dimensions. When there is burr on the surface of the multilayer board or deviation size is too large, and other reasons to reduce the transmission efficiency of the multilayer board, the movement of the magnetic slider corresponds to the realization of the movement of the cutter, which not only cooperates with the reverse movement of the multilayer board to improve the scraping cleaning effect of the burrs or size deviation, but also changes the air pressure inside the gas groove, so as to achieve the vibration clearing performance of the filter screen inside the stock box, which is environmentally friendly, stable, and efficient.

Reference numerals: 1, extrusion mold; 2, converging extrusion portion; 3, molding port; 4, PVC wrapping layer; 5, multilayer board; 6, lateral fixing block; 7, input cylinder; 8, injection port; 9, hydraulic cylinder; 10, telescopic end; 11, push-in block; 12, guiding plate; 13, sliding groove; 14, push plate; 15, guiding block; 16, slot; 17, metal pipe; 18, top input pipe; 19, first transverse pipe; 20, pipe holder; 21, wire; 22, air pump; 23, stock box; 24, connecting pipe; 25, molding mechanism; 26, bottom input pipe; 27, second transverse pipe; 28, burr removing frame; 29, drop box; 30, tapered end; 31, triangular pipe; 32, connection hole; 33, suction box; 34, gas groove; 35, corner block; 36, sliding plate; 37, cutter; 38, discharge groove; 39, suction hole; 40, door skeleton; 41, SMC door skin; 42, PU filling foam; 43, fixed electromagnetic plate; 44, magnetic slider; 45, connection spring; 46, sliding stopper; 47, connecting rod; 48, slide slot.

DETAILED DESCRIPTION

The technical solutions in the embodiments of the present disclosure will be clearly described below in conjunction with the accompanying drawings in the embodiments of the present disclosure, and it is clear that the described embodiments are a part of the embodiments of the present disclosure and not all of the embodiments. Based on the embodiments in the present disclosure, all other embodiments obtained by those skilled in the art fall within the scope of the present disclosure.

Embodiment I

The present disclosure provides a door with a plastic-wood co-extruded skeleton as shown in FIGS. 1-FIG. 9, including a door skeleton 40; the door skeleton 40 includes four multilayer boards 5, the four multilayer boards 5 forming a rectangular frame structure; an outer surface of each multilayer board 5 is wrapped with a PVC wrapping layer 4, and an outer side of the PVC wrapping layer 4 is attached to an SMC door skin 41; a PU filling foam 42 is filled between an outer periphery of the door skeleton 40 and a wall structure outside the door skeleton 40.

The present disclosure further discloses a processing method of a door with a plastic-wood co-extruded skeleton, for processing a door with a plastic-wood co-extruded skeleton and includes the following steps.

Figure 7:
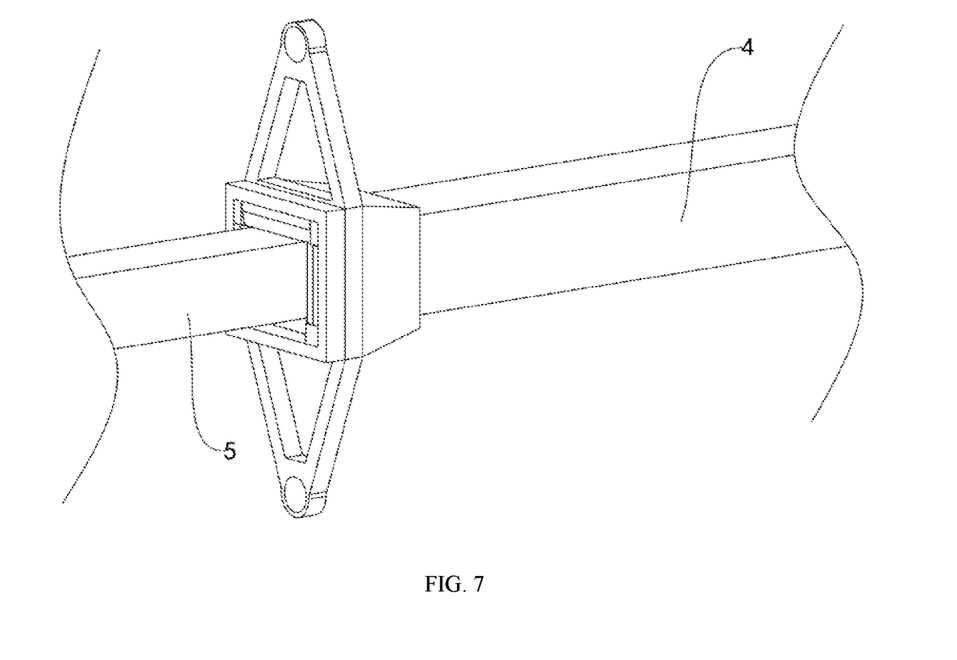
FIG. 7 is a structural schematic view of a PVC wrapping layer and a multilayer board according to an embodiment of the present disclosure.
Figure 8:
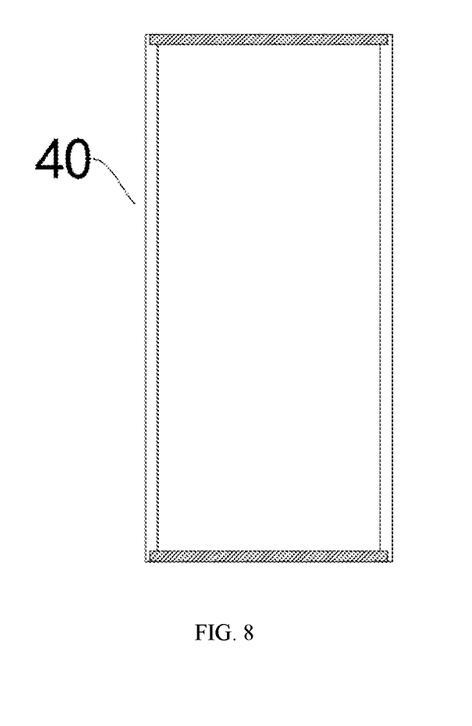
FIG. 8 is a structural schematic view of a door skeleton according to an embodiment of the present disclosure.
Figure 9:
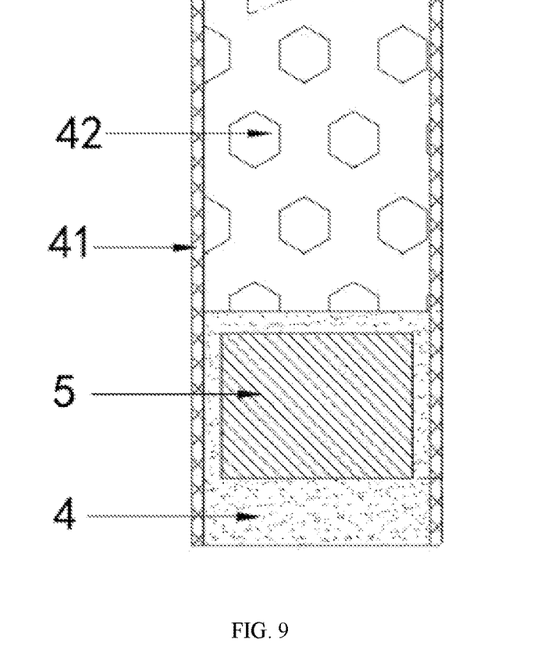
FIG. 9 is a structural schematic view of an SMC door skin according to an embodiment of the present disclosure.

S1: preparing a strip of wood and a mixture of glues, and processing multiple the strips of wood and the mixture of glues through an extruder, such that the multiple strips of wood are extruded to form a multilayer board 5;

S2: wrapping an outer surface of the multilayer board 5 with a PVC wrapping layer 4 through a hemming device;

S3: splicing multiple the multilayer boards 5 wrapped with the PVC wrapping layers 4 to form a rectangular door skeleton 40, and attaching an SMC door skin 41 to an outer side of the door skeleton 40.

Figure 1:
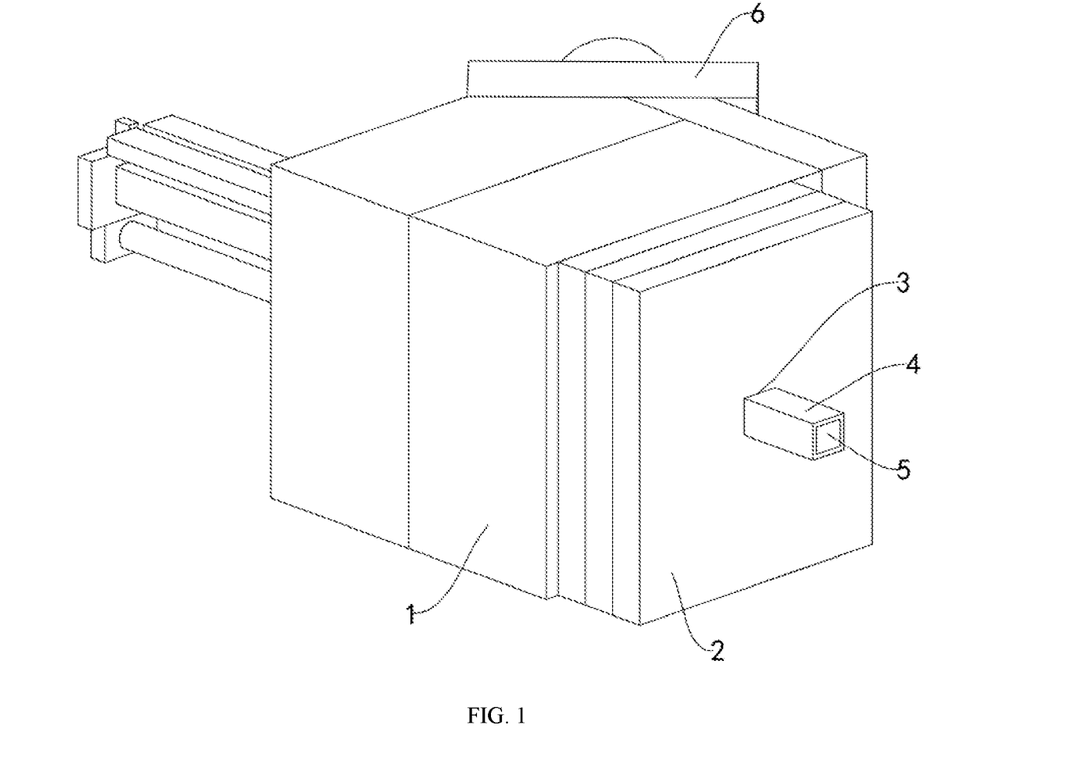
FIG. 1 is a structural schematic view of a hemming device for a door with a plastic-wood co-extruded skeleton, in a viewing angle, according to an embodiment of the present disclosure.
Figure 2:
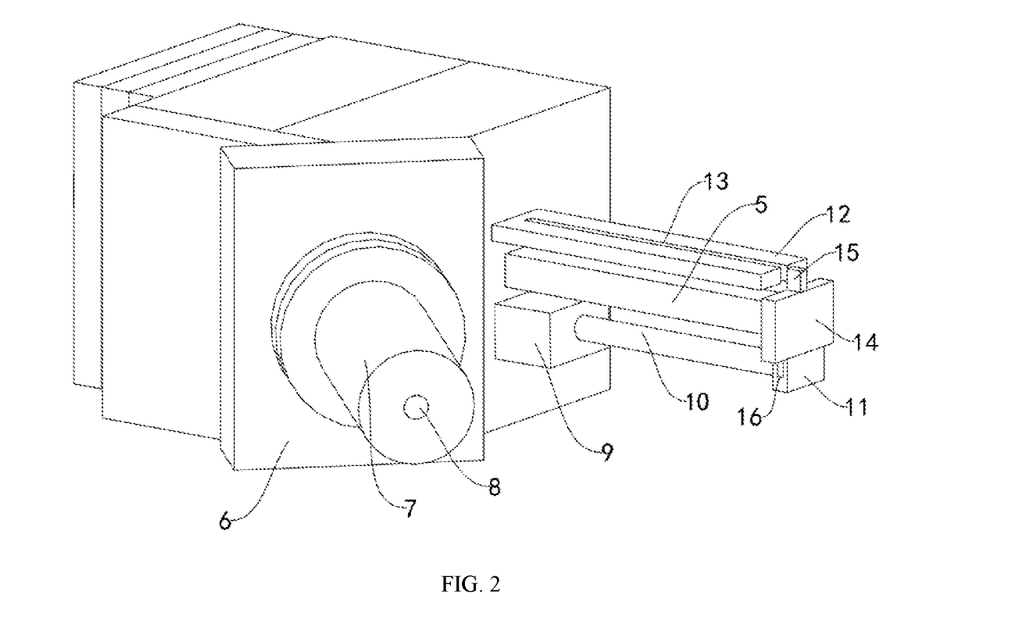
FIG. 2 is a structural schematic view of a hemming device for a door with a plastic-wood co-extruded skeleton, in another viewing angle, according to an embodiment of the present disclosure.

In order to solve the problem that the wood itself, during the cutting and extruding process, produces small-sized chips and burrs, which are mixed together during the wrapping process of the PVC material, resulting in a bulge and an unattractive appearance, the present disclosure further discloses a hemming device for a door with a plastic-wood co-extruded skeleton. The hemming device includes an extrusion mold 1 and a propulsion mechanism; the extrusion mold 1 is configured to extrude and laminate the multiple multilayer boards 5, and the propulsion mechanism is configured to advance the multiple multilayer boards 5; the propulsion mechanism is arranged on a side of the extrusion mold 1, and another side of the extrusion mold 1 is arranged with a converging extrusion portion 2; the extrusion mold 1 is arranged with a timber port for receiving the multilayer board 5, and the timber port runs through two sides of the extrusion mold 1; the converging extrusion portion 2 is arranged with a molding port 3 running through two sides of the converging extrusion portion 2; an end of the molding port 3 is in communication with the timber port; a radius of the molding port 3 is greater than a radius of the timber port; the propulsion mechanism is capable of pushing the multilayer board 5 through the timber port, and an end of the multilayer board 5 is pushed out of the molding port 3 after a skin is wrapped, which may reduce the operation of manually pushing the multilayer board 5, thereby improving efficiency and realizing automated operation.

The propulsion mechanism includes a hydraulic cylinder 9 and a guiding plate 12; the hydraulic cylinder 9 is arranged at a bottom end of the multilayer board 5; a side of the hydraulic cylinder 9 is fixedly connected to a side of the extrusion mold 1; the guiding plate 12 is arranged at a top end of the multilayer board 5, and a side of the guiding plate 12 is fixedly connected to the side of the extrusion mold 1; a top end of the guiding plate 12 defines a sliding groove 13; a side of the hydraulic cylinder 9 away from the extrusion mold 1 is arranged with a telescopic end 10, and a side of the telescopic end 10 is arranged with a push-in block 11; the hydraulic cylinder 9 can be activated to drive the telescopic end 10 to push out and contract.

A top of the push-in block 11 defines a slot 16; the top of the push-in block 11 is arranged with a push plate 14, and a bottom end of the push plate 14 is arranged with an electromagnetic block; the electromagnetic block is clamped to an inside of the slot 16, and the electromagnetic block and the push-in block 11 are magnetically connected; a middle part of a top end of the push plate 14 is arranged with a guiding block 15; the electromagnetic block is connected to a power supply, and the personnel can control whether the electromagnetic block is disconnected from the power or connected to the power by a switch. It is noted that the push-in block 11 is made of an iron block material or a material that can be magnetically attracted to the electromagnetic block, and the push-in block 11 can be adsorptively connected to the energized electromagnetic block to increase firmness.

The guiding block 15 is slidably arranged in the sliding groove 13, and positions of the guiding block 15 and the sliding groove 13 correspond to each other; a square slot is defined on a side of the push plate 14 near the extrusion mold 1, and an end of the multilayer board 5 is clamped in the square slot.

In the actual operation of the present disclosure, an end of the multilayer board 5 is extended into the interior of the timber port, and the other end of the multilayer board 5 is clamped in the square slot of the push plate 14; the hydraulic cylinder 9 is activated to make the telescopic end 10 retracted, and when the telescopic end 10 retracts, the push-in block 11 is driven to move in a direction close to the extrusion mold 1; the push-in block 11 pushes the push plate 14 on the top of the push-in block 11, thereby pushing the multilayer board 5 into the interior of the timber port, such that the multilayer board 5 continues to extend; when the push plate 14 is moved, the guiding block 15 on the push plate 14 enters into the interior of the sliding groove 13 and slides in a direction toward the extrusion mold 1 to play a guiding role, keeping the multilayer board 5 in a vertical state in the process of pushing in.

In addition, the whole push plate 14 can be disassembled from the push-in block 11 to prevent an end blocking the multilayer board 5 from being placed inside the timber port caused by blocking the multilayer board 5 being too long. When the push plate 14 is required to be disassembled, the electromagnetic block at the bottom end of the push plate 14 can be de-energized, such that the push plate 14 and the push-in block 11 are no longer adsorptively connected. When the push plate 14 and the push-in block 11 are required to be fixedly connected, the electromagnetic block of the push plate 14 is first inserted into the interior of the slot 16, and the electromagnetic block is energized and connected, such that the electromagnetic block and the push-in block 11 are magnetically attracted and fixed to prevent the push plate 14 and the push-in block 11 from falling off in the pushing process.

Figure 3:
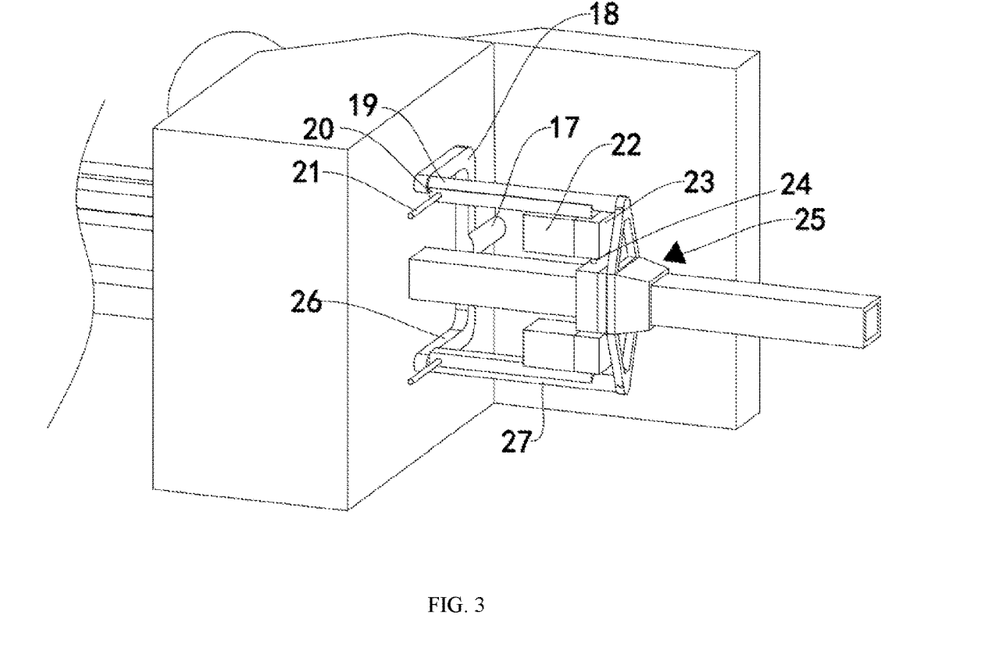
FIG. 3 is a structural schematic view of a first transverse pipe, a pipe holder, and a wire according to an embodiment of the present disclosure.

The extrusion mold 1 defines an internal cavity; a corner of the extrusion mold 1 is beveled, and a lateral fixing block 6 is arranged at the beveled cut; a pipe port is arranged on the lateral fixing block 6, and an input cylinder 7 is flange-connected at an end of the pipe port; an injection port 8 is arranged on the input cylinder 7; a metal pipe 17 is arranged inside the pipe port, the metal pipe 17 is connected to the injection port 8, and the metal pipe 17 is extended into the internal cavity of the extrusion mold 1; an end of the metal pipe 17 is shunted with a top input pipe 18 and a bottom input pipe 26; a side of the top input pipe 18 near the converging extrusion portion 2 is connected with a first transverse pipe 19, and a side of the bottom input pipe 26 near the converging extrusion portion 2 is connected with a second transverse pipe 27; a molding mechanism 25 is arranged in the interior of the converging extrusion portion 2; an outer circle of the molding mechanism 25 for the multilayer board 5 to go through is wrapped with the PVC wrapping layer 4 on, and the PVC wrapping layer 4 is wrapped on the outer surface of the multilayer board 5 through the molding mechanism 25. In the actual operation of the present disclosure, the PVC material is heated to a molten state, and the molten PVC material is input into the injection port 8 of the input cylinder 7; the molten PVC material is input into the metal pipe 17 from the injection port 8, and is finally discharged to the molding mechanism 25 through the first transverse pipe 19 and the second transverse pipe 27 by means of the transmission of the metal pipe 17; the molding mechanism 25 pours the PVC material to the outer side of the multilayer board 5 to carry out the skin wrapping process.

Figure 4:
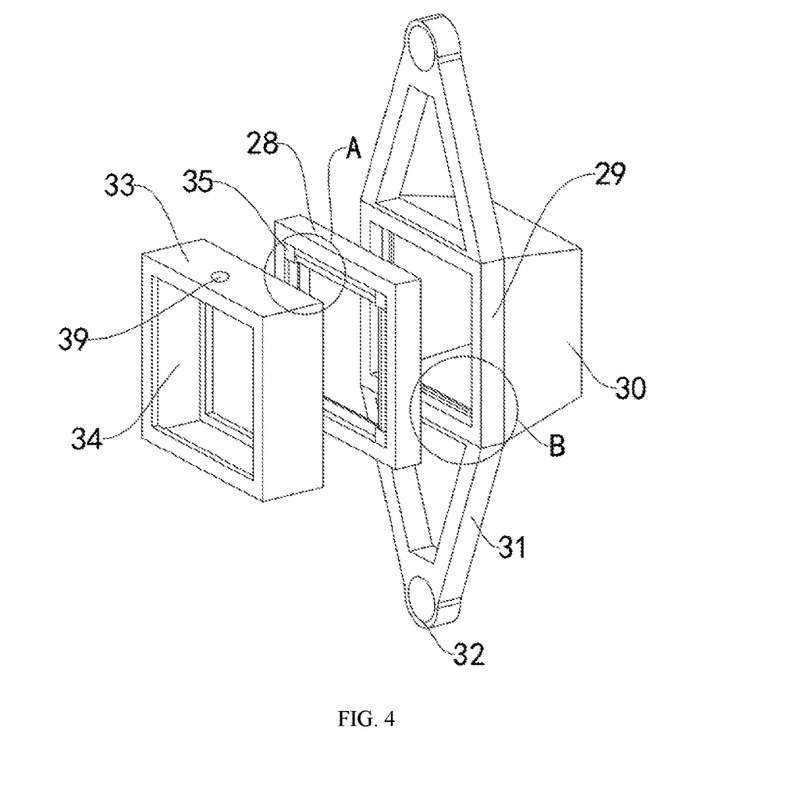
FIG. 4 is a structural schematic view of a molding mechanism according to an embodiment of the present disclosure.
Figure 5:
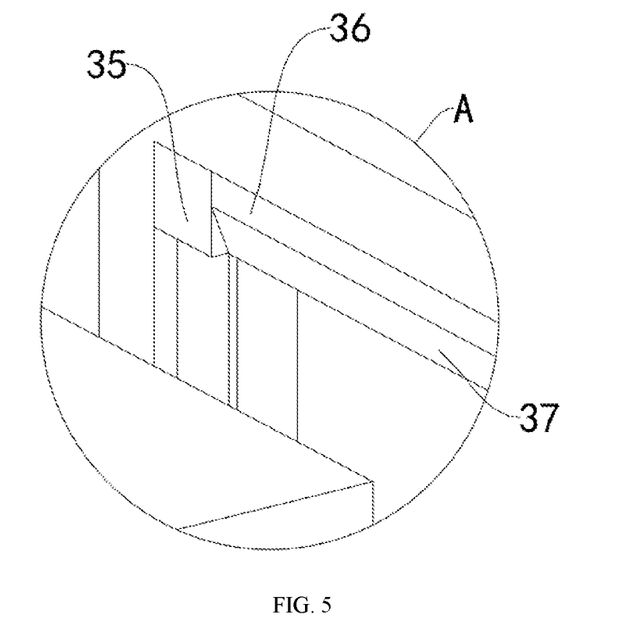
FIG. 5 is an enlarged structural schematic view of area A in FIG. 4.
Figure 6:
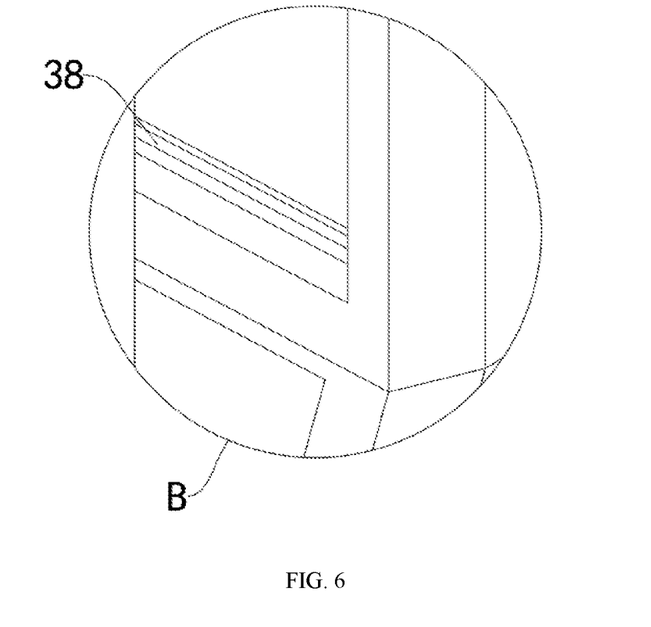
FIG. 6 is an enlarged structural schematic view of area B in FIG. 4.

Further, the molding mechanism 25 includes a suction box 33, a burr removing frame 28, and a drop box 29; the suction box 33, the burr removing frame 28, and the drop box 29 are connected and distributed sequentially along a direction from the propulsion mechanism to the converging extrusion portion 2; each of the suction box 33, the burr removing frame 28, and the drop box 29 defines a square hole for the multilayer board 5 to pass through, for facilitating the entry and passage of the multilayer board 5. An inner circle of the suction box 33 defines a circle of gas groove 34; a top end and a bottom end of the gas groove 34 are each arranged with a suction hole 39, and the suction hole 39 is arranged with a connecting pipe 24; another end of the connecting pipe 24 is connected to a stock box 23, such that gases and the impurities, etc. inside the gas groove 34 can enter into the interior of the stock box 23 along the suction holes 39 for temporary storage.

Each of four corners inside the burr removing frame 28 is arranged with a corner block 35; a sliding plate 36 is arranged between two the corner blocks 35 that are parallel; the corner blocks 35 can fix two sides of the sliding plate 36; each of end surfaces of four the sliding plates 36 facing each other is arranged with a cutter 37; four the cutters 37 are affixed to the four surfaces of the multilayer board 5; each of a top and a bottom of the drop box 29 is connected to a triangular pipe 31; each of ends of two the triangular pipes 31 away from each other defines a connection hole 32; one of two the connection holes 32 is connected to the first transverse pipe 19, and the other of the two connection holes 32 is connected to the second transverse pipe 27; an inner circle of the drop box 29 defines a circle of discharge groove 38, and the two triangular pipes 31 are connected to the discharge groove 38; a side of the drop box 29 away from the burr removing frame 28 is arranged with a tapered end 30; further, a side of each of the two stock boxes 23 near the propulsion mechanism is arranged with an air pump 22, and a suction port of the air pump 22 is connected to the interior of the stock box 23.

In the actual operation of the present disclosure, the multilayer board 5 passes through the timber port and enters into the interior of the molding mechanism 25; the multilayer board 5 first passes through the suction box 33, and then passes through the burr removing frame 28; the four cutters 37 on the inner circle of the burr removing frame 28 will be affixed to the surfaces of the multilayer board 5, and match with the size of the multilayer board 5; when there is a burr on the multilayer board 5 that passes through the four cutters 37, or when the size has a slight deviation, the burr or deviated part will be removed by the four cutters 37 and will be blocked outside the burr removing frame 28, to be stored inside the gas groove 34 of the suction box 33, thereby preventing the burr and the debris from entering into the process of pouring PVC material.

In this case, both the air pumps 22 are activated. Because the air pump 22, the stock box 23, and the gas groove 34 are connected in sequence, the air pump 22 is activated for pumping, such that the burrs and debris inside the gas groove 34 will be sucked into the inside of the stock box 23 through the connecting pipe 24.

After burr treatment, the multilayer board 5 goes into the interior of the drop box 29, in which case the molten PVC material passing through the first transverse pipe 19 and the second transverse pipe 27 enters into the interior of the triangular pipe 31, and enters into the interior of the discharge groove 38 of the drop box 29 through the diversion of the triangular pipe 31, forming a circle of liquid affixed to the outer circle of the multilayer board 5; due to the blocking effect of the four cutters 37, the molten PVC material may be prevented from leaking out, and only exists in the interior of the drop box 29 and fills up the interior of the drop box 29; the drop box 29 is connected to the tapered end 30, such that the PVC material can be molded, thereby completing the hemming process in the process of advancing the multilayer board 5.

A radius of the tapered end 30 away from the drop box 29 is less than a radius of the tapered end 30 near the drop box 29; each of sides of the first transverse pipe 19 and the second transverse pipe 27 near each other is arranged with a pipe holder 20, and an arcuate groove is defined on each of two the pipe holders 20; one of two the arcuate grooves is clamped on a pipe body of the first transverse pipe 19, and the other of two the arcuate grooves is clamped on a pipe body of the second transverse pipe 27. It is to be noted that the pipe holder 20 made be made of a heat-conducting metal material.

Each of the two stock boxes 23 is arranged with a filter screen inside; an end of each of the two air pumps 22 is affixed to the pipe holder 20 at a corresponding position; a heating wire is arranged in the arcuate groove of each of the two pipe holders 20, and the heating wire is affixed to the pipe body of a corresponding one of the first transverse pipe 19 and the second transverse pipe 27; a side of each of the two pipe holders 20 is connected to a wire 21, and the wire 21 and the corresponding heating wire is electrically connected to each other.

In the actual operation of the present disclosure, the wires 21 on both the pipe holders 20 are each connected to a power supply, such that the heating wires are energized to generate heat, and the heat is transferred to the first transverse pipe 19 and the second transverse pipe 27; the first transverse pipe 19 and the second transverse pipe 27 transfer the heat to the molten PVC material input inside, thereby preventing the PVC material from cooling and solidifying, and maintaining the molten state of the PVC material. Furthermore, the air pumps 22 are activated, and heat generated by the operation is also transferred to the first transverse pipe 19 and the second transverse pipe 27 through the pipe holders 20 to maintain the heat. In addition, the two pipe holders 20 can also support and protect the first transverse pipe 19 and the second transverse pipe 27.

In the actual operation of the present disclosure, an end of the multilayer board 5 is extended into the interior of the timber port, and the other end of the multilayer board 5 is clamped in the square slot of the push plate 14; the hydraulic cylinder 9 is activated to make the telescopic end 10 retracted, and when the telescopic end 10 retracts, the push-in block 11 is driven to move in a direction close to the extrusion mold 1; the push-in block 11 pushes the push plate 14 on the top of the push-in block 11, thereby pushing the multilayer board 5 into the interior of the timber port, such that the multilayer board 5 continues to extend; when the push plate 14 is moved, the guiding block 15 on the push plate 14 enters into the interior of the sliding groove 13 and slides in a direction toward the extrusion mold 1 to play a guiding role, keeping the multilayer board 5 in a vertical state in the process of pushing in.

In addition, the whole push plate 14 can be disassembled from the push-in block 11 to prevent an end blocking the multilayer board 5 from being placed inside the timber port caused by blocking the multilayer board 5 being too long. When the push plate 14 is required to be disassembled, the electromagnetic block at the bottom end of the push plate 14 can be de-energized, such that the push plate 14 and the push-in block 11 are no longer adsorptively connected. When the push plate 14 and the push-in block 11 are required to be fixedly connected, the electromagnetic block of the push plate 14 is first inserted into the interior of the slot 16, and the electromagnetic block is energized and connected, such that the electromagnetic block and the push-in block 11 are magnetically attracted and fixed to prevent the push plate 14 and the push-in block 11 from falling off in the pushing process.

A top of the push-in block 11 defines a slot 16; the top of the push-in block 11 is arranged with a push plate 14, and a bottom end of the push plate 14 is arranged with an electromagnetic block; the electromagnetic block is clamped to an inside of the slot 16, and the electromagnetic block and the push-in block 11 are magnetically connected; a middle part of a top end of the push plate 14 is arranged with a guiding block 15; the electromagnetic block is connected to a power supply, and the personnel can control whether the electromagnetic block is disconnected from the power or connected to the power by a switch. It is noted that the push-in block 11 is made of an iron block material or a material that can be magnetically attracted to the electromagnetic block, and the push-in block 11 can be adsorptively connected to the energized electromagnetic block to increase firmness.

In the actual operation of the present disclosure, the PVC material is heated to a molten state, and the molten PVC material is input into the injection port 8 of the input cylinder 7; the molten PVC material is input into the metal pipe 17 from the injection port 8, and is finally discharged to the molding mechanism 25 through the first transverse pipe 19 and the second transverse pipe 27 by means of the transmission of the metal pipe 17; the molding mechanism 25 pours the PVC material to the outer side of the multilayer board 5 to carry out the skin wrapping process.

It should be noted that the guiding block 15 is slidably arranged in the sliding groove 13, and positions of the guiding block 15 and the sliding groove 13 correspond to each other; a square slot is defined on a side of the push-in plate 14 near the extrusion mold 1, and an end of the multilayer board 5 is clamped in the square slot.

Specifically, the multilayer board 5 passes through the timber port and enters into the interior of the molding mechanism 25; the multilayer board 5 first passes through the suction box 33, and then passes through the burr removing frame 28; the four cutters 37 on the inner circle of the burr removing frame 28 will be affixed to the surfaces of the multilayer board 5, and match with the size of the multilayer board 5; when there is a burr on the multilayer board 5 that passes through the four cutters 37, or when the size has a slight deviation, the burr or deviated part will be removed by the four cutters 37 and will be blocked outside the burr removing frame 28, to be stored inside the gas groove 34 of the suction box 33, thereby preventing the burr and the debris from entering into the process of pouring PVC material, and preventing bulge and unattractive appearance caused by the burrs and debris mixing with the PVC material.

In this case, both the air pumps 22 are activated. Because the air pump 22, the stock box 23, and the gas groove 34 are connected in sequence, the air pump 22 is activated for pumping, such that the burrs and debris inside the gas groove 34 will be sucked into the inside of the stock box 23 through the connecting pipe 24. In addition, a filter screen is arranged between the stock box 23 and the air pump 22, to prevent the debris and burrs from being sucked into the interior of the air pump 22.

After burr treatment, the multilayer board 5 goes into the interior of the drop box 29, in which case the molten PVC material passing through the first transverse pipe 19 and the second transverse pipe 27 enters into the interior of the triangular pipe 31, and enters into the interior of the discharge groove 38 of the drop box 29 through the diversion of the triangular pipe 31, forming a circle of liquid affixed to the outer circle of the multilayer board 5; due to the blocking effect of the four cutters 37, the molten PVC material may be prevented from leaking out, and only exists in the interior of the drop box 29 and fills up the interior of the drop box 29; the drop box 29 is connected to the tapered end 30, such that the PVC material can be molded, thereby completing the hemming process in the process of advancing the multilayer board 5.

Further, the wires 21 on both the pipe holders 20 are each connected to a power supply, such that the heating wires are energized to generate heat, and the heat is transferred to the first transverse pipe 19 and the second transverse pipe 27; the first transverse pipe 19 and the second transverse pipe 27 transfer the heat to the molten PVC material input inside, thereby preventing the PVC material from cooling and solidifying, and maintaining the molten state of the PVC material. Furthermore, the air pumps 22 are activated, and heat generated by the operation is also transferred to the first transverse pipe 19 and the second transverse pipe 27 through the pipe holders 20 to maintain the heat. In addition, the two pipe holders 20 can also support and protect the first transverse pipe 19 and the second transverse pipe 27.

Embodiment II

Figure 10:
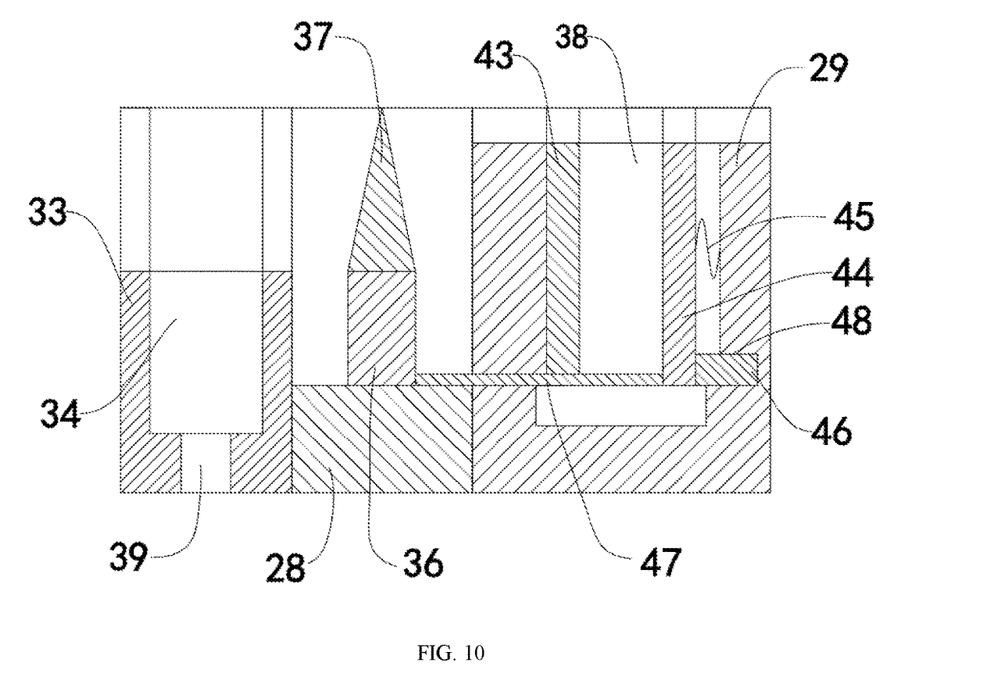
FIG. 10 is a front cross-sectional schematic view of a molding mechanism according to a second embodiment of the present disclosure.

As shown in FIG. 10, since the volume of the PVC material in the molten state decreases after condensation due to the principle of thermal expansion and contraction, and the prior art lacks the ability to adaptively adjust the amount of discharged PVC material in the molten state according to the change in temperature, which in turn causes the size of the PVC wrapping layer 4 formed from the cooling of the PVC material to change. Also, because of the certain size of the molding port 3, the volume changes in the condensed PVC material will have an impact on the discharge efficiency of the multilayer board 5; and when there is burr on the surface of the multilayer board 5 or deviation size is too large, cutting and removing the burr for the obstructed multilayer board 5 only by the fixed setting of the cutter 37 leads to large difficulty of the removing and low accuracy of the correction; further, the moving speed of the multilayer board 5 being affected will also have an impact on the discharging speed of the PVC material, which will have an impact on the heating temperature of the PVC material of the molten state and ultimately affect the size of the PVC wrapping layer 4 after condensation; when the device is used for a long time, the filter screen will be clogged internally because of the stable wind pressure, which will reduce the filtering and recycling effect of the filter screen on the burr impurities and so on.

In order to solve the above problems, the hemming device for a door with a plastic-wood co-extruded skeleton further includes: a speed sensor arranged in the interior of the timber port, and configured to detect the moving speed of the multilayer board 5 in the interior of the timber port; a first temperature sensor is arranged in the interior of the molding port 3, and the first temperature sensor is configured to detect the temperature value at the molding port 3, that is, the temperature value of the PVC wrapping layer 4 after condensation; a second temperature sensor is arranged on an inner wall of the discharge groove 38, and the second temperature sensor is configured to detect the temperature value of the interior of the discharge groove 38, thereby obtaining the temperature value of the molten PVC material, and obtaining a volume reduction of the molten PVC material after condensation according to the difference in temperature detected by the first temperature sensor and the second temperature sensor, thus enabling to adjust the opening size of the discharge groove 38 according to the reduction amount.

An inner side wall of the discharge groove 38 near the cutters 37 is arranged with a fixed electromagnetic plate 43;

a position of the fixed electromagnetic plate 43 does not change, and the magnetic force size of the fixed electromagnetic plate 43 is changed by changing the energized size of the fixed electromagnetic plate 43; a magnetic slider 44 is slidably connected to another inner side wall of the discharge groove 38, and the fixed electromagnetic plate 43 and the magnetic slider 44 are matched; the magnetic slider 44 can move transversely along the inside of the discharge groove 38, and end surfaces of the fixed electromagnetic plate 43 and the magnetic slider 44 facing each other have the same magnetic properties; therefore, when the fixed electromagnetic plate 43 is energized with increased current, the magnetic slider 44 is driven to move along the discharge groove 38 away from the fixed electromagnetic plate 43 by means of the magnetic repulsive force of the fixed electromagnetic plate 43 on the magnetic slider 44, and the opening of the discharge groove 38 is enlarged; a bottom on a side of the magnetic slider 44 near the cutters 37 is arranged with multiple connecting rods 47, and another end of each connecting rod 47 passes through the drop box 29 and is fixedly connected to a side wall of the sliding plate 36; in this way, when the magnetic slider 44 moves transversely, the connecting rods 47 synchronize to drive the sliding plate 36 to move transversely along the corner block 35.

A side of the magnetic slider 44 away from the fixed electromagnetic plate 43 is arranged with a connection spring 45, and the other end of the connection spring 45 is fixedly connected to a side wall of the discharge groove 38; the setting of the connection spring 45 further improves the resilient resetting performance of the magnetic slider 44; a side of the discharge groove 38 near the magnetic slider 44 defines a sliding slot 48, and a sliding stopper 46 is slidably connected inside the sliding slot 48; an end part of the sliding stopper 46 is connected to a side wall of the magnetic slider 44; the sliding stopper 46 cooperates with the magnetic slider 44 to realize the blocking of the discharge groove 38, so as to correspondingly adjust the opening size of the discharge groove 38, thereby further changing the discharge amount of the molten PVC material to the outer surface of the multilayer board 5 along the discharge groove 38.

During the usage process, as illustrated in the Embodiment I, an end of the multilayer board 5 is inserted into the timber port, and the other end of the multilayer board 5 is inserted into the square slot on a side of the push plate 14; the hydraulic cylinder 9 is activated and drives the pusher plate 14 to move close to the extrusion mold 1 through the telescopic end 10, which in turn drives the multilayer board 5 to continuously enter into the interior of the extrusion mold 1 for the subsequent laminating process; in this case, the speed sensor inside the timber port detects whether the moving speed of the multilayer board 5 reaches a preset speed value; the multilayer board 5 continues to be advanced, and the multilayer board 5 in turn goes through the suction box 33, burr removing box 28, and drop box 29 to the molding port 3; the air pump 22 is activated and applies air suction upon the gas groove 34 with the help of the air pipe, and the cutter 37 cuts the burr or size deviation, etc. outside the surface of the multilayer board 5, and the cut debris, etc. flow back to the inside of the stock box 23 for temporary storage under the suction force of the air pump 22.

Afterwards, the molten PVC material is input into the input cylinder 7 along the injection port 8, and the molten PVC material is input into the first transverse pipe 19 and the second transverse pipe 27 along the top input pipe 18 and the bottom input pipe 26, and is finally discharged to the outer surface of the multilayer board 5 along the discharge groove 38 to form the PVC wrapping layer 4; the multilayer board 5 after the formation of the PVC wrapping layer 4 is discharged along the molding port 3, and the first temperature sensor detects the temperature value of the PVC wrapping layer 4 after condensation.

When the molten PVC material passes through the interior of the discharge groove 38, the second temperature sensor detects the temperature value of the PVC material in the molten state, and the difference in temperatures detected by the first temperature sensor and the second temperature sensor directly determines the amount of contraction of the volume of the PVC material under the principle of thermal expansion and cold contraction, i.e., the volume of the molten PVC material will be reduced when it is condensed, and if the difference between the two temperatures is greater, the greater the reduction of volume. Therefore, in order to ensure that the condensed PVC wrapping layer 4 meets a required volume, when the temperature difference detected by the first temperature sensor and the second temperature sensor increases, which is mostly the case in the existing device that the temperature detected by the first temperature sensor decreases and the temperature value detected by the second temperature sensor remains unchanged, the volume of the PVC material in the molten state that needs to be discharged along the discharge groove 38 increases, thereby ensuring that the volume of the molten PVC material after condensation meets the requirements of the PVC wrapping layer 4.

Therefore, in practice, when the speed sensor detects no change in the moving speed of the multilayer board 5 and is always at the preset speed value, and the temperature difference detected by the first temperature sensor and the second temperature sensor increases (conventionally, the temperature value detected by the first temperature sensor decreases), then it is necessary to increase the discharge volume of the molten PVC material along the discharge groove 38 to the outer surface of the multilayer board 5. In this case, the fixed electromagnetic plate 43 is energized with increased current, and the magnetic slider 44 is driven to squeeze the connecting spring 45 and move away from the fixed electromagnetic plate 43 by means of the magnetic repulsive force of the fixed electromagnetic plate 43 on the magnetic slider 44; the magnetic slider 44 drives the sliding stopper 46 to move along the sliding slot 48; therefore, the magnetic slider 44 and the sliding stopper 46 block the discharge groove 38 with a decreased area; the opening of the discharge groove 38 increases, and the discharge amount of the molten PVC material to the outer surface of the multilayer board 5 along the discharge groove 38 increases, such that the volume of the PVC wrapping layer 4 formed after condensation does not change, meeting the actual production requirements.

With the continuous transmission of the multilayer board 5, when there is burr on the surface of the multilayer board 5 or deviation size is too large, the multilayer board 5 moves to the cutters 37 and is hindered by the friction with the cutters 37; the moving speed of the multilayer board 5 decreases; the moving speed of the multilayer board 5 detected by the speed sensor decreases, and then the discharge speed of the molten PVC material from the discharge groove 38 decreases; the temperature value detected by the second temperature sensor continues to rise, such that in order to ensure that the PVC wrapping layer 4 formed by the PVC material in the molten state after condensation meets the desired size and to improve the cleaning efficiency of the burrs on the outer surface of the multilayer board 5 or size deviations, the energizing current of the fixed electromagnetic plate 43 decreases; in this way, the magnetic repulsive force of the fixed electromagnetic plate 43 on the magnetic slider 44 decreases, and under the action of the elasticity of the connection spring 45, the magnetic slider 44 moves toward the fixed electromagnetic plate 43; the magnetic slider 44 drives the sliding stopper 46 to slide out along the sliding slot 48; the magnetic slider 44 cooperates with the sliding stopper 46 to block the discharge groove 38 with an increased area, such that the opening area of the discharge groove 38 decreases, and the discharge amount of the molten PVC material along the discharge groove 38 decreases, thereby ensuring that the molten PVC material falling on the outer surface of the multilayer board 5 is condensed to form the PVC wrapping layer 4 meeting the required size.

When the magnetic slider 44 moves, it synchronously drives the sliding plate 36 to move toward the gas groove 34 through the connecting rod 47; when the sliding plate 36 moves, it synchronously drives the cutter 37 to move toward the gas groove 34; the cutter 37 moves in the opposite direction to the multilayer board 5, then the cutter 37 scrapes off the burrs on the outer surface of the multilayer board 5 or size deviations, thereby effectively improving the cleanliness and smoothness of the outer surface of the multilayer board 5, and avoiding obstruction of the movement of the multilayer board 5 due to the burrs or size deviations.

When the sliding plate 36 drives the cutter 37 to move, the distance between the sliding plate 36 together with the cutter 37 and the gas groove 34 decreases; then under the suction effect of the activated air pump 22, the air pressure inside the gas groove 34 changes, and the air pressure changes will make the filter screen inside the stock box 23 vibrate, thereby effectively improving the vibration cleaning effect on the blockage impurities inside the filter screen, improving self-cleaning ability and stability of the filter screen, and ensuring filtering and debris removal performance of the screen for the subsequent burr impurities.

When the cleaning and removing of the burrs on the outer surface of the multilayer board 5 or size deviations is completed, the multilayer board 5 repeats the above process to continue to move, and the speed value detected by the speed sensor is restored to the preset speed value; in this case, as the temperature value detected by the second temperature sensor increases, and the temperature value detected by the first temperature sensor and the second temperature sensor is greater than the preset temperature difference, the fixed electromagnetic plate 43 is energized with increased current; the magnetic repulsion of the fixed electromagnetic plate 43 on the magnetic slider 44 increases, and the magnetic slider 44 squeezes the connection spring 45 and drives the sliding stopper 46 to move along the sliding slot 48 away from the fixed electromagnetic plate 43; the opening area of the discharge groove 38 increases, and the discharge amount of the molten PVC material along the discharge groove 38 increases; in this way, the size of the PVC wrapping layer 4 formed when the material is condensed meets the desired requirements, and then the above process is continuously repeated for subsequent use.

When a section of the multilayer board 5 is pushed by the push plate 14 to move all the way to the inside of the extrusion mold 1, the hydraulic cylinder 9 reverses to start driving the push plate 14 reverse movement to restore the original position, at this time due to the multilayer board 5 inside the extrusion mold 1 to stop working, then the speed sensor detected the speed value is reduced to zero, corresponding to the fixed electromagnetic plate 43 of the energized current is reduced to zero, the fixed electromagnetic plate 43 of the magnetic repulsion of the magnetic slide 44 is reduced to zero, in the connection spring 45 of the spring 45, the fixed electromagnetic plate 43 is reduced to zero, and the fixed electromagnetic plate 43 is reduced to zero, and the fixed electromagnetic plate 43 is reduced to zero. The magnetic repulsion force of the fixed electromagnetic plate 43 on the magnetic slider 44 decreases to zero, the magnetic slider 44 drives the sliding stopper 46 to move to the maximum distance near the end of the fixed electromagnetic plate 43 under the elastic force of the connecting spring 45, the discharge groove 38 is blocked by the magnetic slider 44 and the sliding stopper 46, and the PVC material in the molten state cannot be discharged along the discharge groove 38, so as to avoid the multilayer board 5 from wrapping excessive PVC material in the molten state at that place, and to insert the new multilayer board 5 into the The lumber opening and the inside of the square slot in the side wall of the pusher plate 14, restarting the device, An wrapping the PVC material in the molten state on the surface of the multilayer board 5 in accordance with the above-described process, and forming the PVC wrapping layer 4 of a size meeting the requirements after condensation to complete the production process.

The device is simple to operate, with precise control and one-time realization of the outer surface of the multilayer board 5 wrapped with the PVC wrapping layer 4, thereby improving the production efficiency and production effect of the door with a plastic-wood co-extruded skeleton. In addition, according to the principle of thermal expansion and contraction of the PVC material in the molten state, the magnetic force of the fixed electromagnetic plate 43 may be correspondingly adjusted, so as to change the opening size of the discharge groove 38, ensuring that the PVC wrapping layer 4 formed by condensation meets the actual size requirements, with high precision of processing dimensions. When there is burr on the surface of the multilayer board 5 or deviation size is too large, and other reasons to reduce the transmission efficiency of the multilayer board 5, the movement of the magnetic slider 44 corresponds to the realization of the movement of the cutter 37, which not only cooperates with the reverse movement of the multilayer board 5 to improve the scraping cleaning effect of the burrs or size deviation, but also changes the air pressure inside the gas groove 34, so as to achieve the vibration clearing performance of the filter screen inside the stock box 23, which is environmentally friendly, stable, and efficient.

Although the embodiments of the present disclosure have been shown and described, it is understood to those skilled in the art that a variety of changes, modifications, substitutions, and variations can be made to these embodiments without departing from the principle and spirit of the present disclosure, and the scope of the present disclosure is limited by the appended claims and their equivalents.

What is claimed is:

1. A hemming device for a door with a plastic-wood co-extruded skeleton, configured to perform a hemming process on doors or windows, comprising:

an extrusion mold and a propulsion mechanism; wherein the propulsion mechanism is arranged on a side of the extrusion mold, and another side of the extrusion mold is arranged with a converging extrusion portion; the extrusion mold is arranged with a timber port for receiving the multilayer board, and a speed sensor is arranged in the timber port; a molding port is arranged in the converging extrusion portion, and a first temperature sensor is arranged in the molding port; a molding mechanism is arranged in the converging extrusion portion; the molding mechanism comprises a suction box, a burr removing frame, and a drop box; an inner circle of the suction box defines a circle of a gas groove; a top end and a bottom end of the gas groove are each through the suction box and arranged with a suction hole; each of four corners inside the burr removing frame is arranged with a corner block; a sliding plate is arranged between two the corner blocks that are parallel; each of end surfaces of four the sliding plates facing each other is arranged with a cutter; an inner circle of the drop box defines a circle of a discharge groove; an inner wall of the discharge groove is arranged with a second temperature sensor; an inner side wall of the discharge groove near the cutter is arranged with a fixed electromagnetic plate; a magnetic slider is slidably connected to another inner side wall of the discharge groove, and the fixed electromagnetic plate and the magnetic slider are matched; a bottom on a side of the magnetic slider near the cutter is arranged with a plurality of connecting rods, and an end of each connecting rod passes through the drop box and is fixedly connected to a side wall of the sliding plate.

2. The hemming device according to claim 1, wherein the propulsion mechanism is arranged on a side of the extrusion mold; the timber port runs through two sides of the extrusion mold; the molding port runs through two sides of the converging extrusion portion; an end of the molding port is in communication with the timber port; a radius of the molding port is greater than a radius of the timber port; the extrusion mold defines an internal cavity; a corner of the extrusion mold is beveled, and a lateral fixing block is arranged at a beveled cut; a pipe port is arranged on the lateral fixing block, and an input cylinder is flange-connected at an end of the pipe port; an injection port is arranged on the input cylinder; a metal pipe is arranged inside the pipe port, the metal pipe is connected to the injection port, and the metal pipe is extended into the internal cavity of the extrusion mold; an end of the metal pipe is shunted with a top input pipe and a bottom input pipe; a side of the top input pipe near the converging extrusion portion is connected with a first transverse pipe, and a side of the bottom input pipe near the converging extrusion portion is connected with a second transverse pipe; the PVC wrapping layer is wrapped on the outer surface of the multilayer board through the molding mechanism.

3. The hemming device according to claim 1, wherein the suction box, the burr removing frame, and the drop box are connected and distributed sequentially along a direction from the propulsion mechanism to the converging extrusion portion; each of the suction box, the burr removing frame, and the drop box defines a square hole for the multilayer board to pass through; the suction hole is arranged with a connecting pipe; an end of the connecting pipe is connected to a stock box; a side of the stock box near the propulsion mechanism is arranged with an air pump, and a suction port of the air pump is connected to an interior of the stock box; a filter screen is arranged in the stock box.

4. The hemming device according to claim 3, wherein four the cutters are affixed to four surfaces of the multilayer board; each of a top and a bottom of the drop box is connected to a triangular pipe; each of ends of two the triangular pipes away from each other defines a connection hole; one of two the connection holes is connected to the first transverse pipe, and the other of the two connection holes is connected to the second transverse pipe; the two triangular pipes are connected to the discharge groove; a side of the drop box away from the burr removing frame is arranged with a tapered end.

5. The hemming device according to claim 4, wherein a radius of the tapered end away from the drop box is less than a radius of the tapered end near the drop box; each of sides of the first transverse pipe and the second transverse pipe near each other is arranged with a pipe holder, and an arcuate groove is defined on each of two the pipe holders; one of two the arcuate grooves is clamped on a pipe body of the first transverse pipe, and the other of the two arcuate grooves is clamped on a pipe body of the second transverse pipe; an end of each of the two air pumps is affixed to a corresponding pipe holder; a heating wire is arranged in the arcuate groove of each of the two pipe holders, and the heating wire is affixed to the pipe body of a corresponding one of the first transverse pipe and the second transverse pipe; a side of each of the two pipe holders is connected to a wire, and the wire and the corresponding heating wire is electrically connected to each other.

6. The hemming device according to claim 1, wherein the propulsion mechanism comprises a hydraulic cylinder and a guiding plate; the hydraulic cylinder is arranged at a bottom end of the multilayer board; a side of the hydraulic cylinder is fixedly connected to a side of the extrusion mold; the guiding plate is arranged at a top end of the multilayer board, and a side of the guiding plate is fixedly connected to the side of the extrusion mold; a top end of the guiding plate defines a sliding groove; a side of the hydraulic cylinder away from the extrusion mold is arranged with a telescopic end, and a side of the telescopic end is arranged with a push-in block.

7. The hemming device according to claim 6, wherein a top of the push-in block defines a slot; the top of the push-in block is arranged with a push plate, and a bottom end of the push plate is arranged with an electromagnetic block; the electromagnetic block is clamped to an interior of the slot, and the electromagnetic block and the push-in block are magnetically connected; a middle part of a top end of the push plate is arranged with a guiding block; the guiding block is slidably arranged in the sliding groove, and positions of the guiding block and the sliding groove correspond to each other; a square slot is defined on a side of the push plate near the extrusion mold, and an end of the multilayer board is clamped in the square slot.

8. The hemming device according to claim 1, wherein a side of the magnetic slider away from the fixed electromagnetic plate is arranged with a connection spring, and an end of the connection spring is fixedly connected to a side wall of the discharge groove; a side of the discharge groove near the magnetic slider defines a sliding slot, and a sliding stopper is slidably connected inside the sliding slot; an end part of the sliding stopper is connected to a side wall of the magnetic slider.

* * * * *